(12) United States Patent
Koenigs

(10) Patent No.: US 7,307,576 B1
(45) Date of Patent: Dec. 11, 2007

(54) HAZARDOUS AND NON-HAZARDOUS WEATHER IDENTIFICATION SYSTEM AND METHOD

(75) Inventor: Gregory J. Koenigs, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 210 days.

(21) Appl. No.: 11/233,690

(22) Filed: Sep. 23, 2005

(51) Int. Cl.
*G01S 13/95* (2006.01)
(52) U.S. Cl. ............................... 342/26 R; 342/26 B
(58) Field of Classification Search .............. 342/26 R, 342/26 A, 26 B, 26 C, 26 D
See application file for complete search history.

(56) References Cited

U.S. PATENT DOCUMENTS

| | | | |
|---|---|---|---|
| 4,835,536 A | 5/1989 | Piesinger et al. | |
| 5,049,886 A | 9/1991 | Seitz et al. | |
| 5,077,558 A | 12/1991 | Kuntman | |
| 5,130,712 A * | 7/1992 | Rubin et al. ............. | 342/26 D |
| 5,198,819 A | 3/1993 | Susnjara | |
| 5,311,183 A | 5/1994 | Mathews et al. | |
| 5,945,926 A | 8/1999 | Ammar et al. | |
| 6,201,494 B1 | 3/2001 | Kronfeld | |
| 6,208,284 B1 | 3/2001 | Woodell et al. | |
| 6,246,367 B1 * | 6/2001 | Markson et al. ............. | 342/460 |
| 6,278,799 B1 * | 8/2001 | Hoffman ................. | 382/159 |
| 6,388,607 B1 | 5/2002 | Woodell | |
| 6,388,608 B1 | 5/2002 | Woodell et al. | |
| 6,404,397 B1 * | 6/2002 | Grinberg et al. ............. | 343/753 |
| 6,424,288 B1 | 7/2002 | Woodell | |
| 6,456,226 B1 | 9/2002 | Zheng et al. | |
| 6,512,476 B1 | 1/2003 | Woodell | |
| 6,549,161 B1 | 4/2003 | Woodell | |
| 6,597,305 B2 | 7/2003 | Szeto et al. | |
| 6,603,425 B1 | 8/2003 | Woodell | |
| 6,690,317 B2 | 2/2004 | Szeto et al. | |
| 6,741,203 B1 * | 5/2004 | Woodell ................. | 342/26 B |
| 6,850,185 B1 | 2/2005 | Woodell | |
| 6,879,280 B1 | 4/2005 | Bull et al. | |
| 6,882,302 B1 | 4/2005 | Woodell et al. | |
| 7,042,387 B2 | 5/2006 | Ridenour et al. | |
| 7,242,343 B1 * | 7/2007 | Woodell ................. | 342/26 B |
| 2003/0016156 A1 | 1/2003 | Szeto et al. | |
| 2003/0156734 A1 * | 8/2003 | Wolfson et al. ............. | 382/100 |
| 2007/0063875 A1 * | 3/2007 | Hoffberg ................. | 340/995.1 |

OTHER PUBLICATIONS

"Observed response of the Hudson River plume to wind forcing using a nested HF radar array", Kohut, J.T.; Roarty, H.J.; Glenn, S.M.; Schofield, O.; Chant, R.J.; Creed, E.Current Measurement Technology Proceedings of the IEEE/OES Eighth Working Conf. on Jun. 28-29, 2005 pp. 63-65.*
U.S. Appl. No. 11/074,531, filed Mar. 8, 2005, Woodell et al.

* cited by examiner

*Primary Examiner*—John B Sotomayor
(74) *Attorney, Agent, or Firm*—Nathan O. Jensen; Kyle Eppele

(57) ABSTRACT

A weather radar system or method can be utilized to determine non-hazardous weather region for an aircraft. The weather radar system can utilize processing electronics coupled to an antenna. The processing electronics can determine presence of the non-hazardous weather region in response to data related to returns received by the weather radar antenna. The data can include a spatial frequency parameter or reflectivity gradient.

20 Claims, 8 Drawing Sheets

HAZARDOUS AND NON-HAZARDOUS WEATHER IDENTIFICATION SYSTEM AND METHOD

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

This application relates to weather radar systems. More particularly, this application relates to the identification of hazardous and non-hazardous (e.g. stratiform verses convective) by weather radar systems.

Weather radar systems are known in the art for detecting and displaying severe weather to a crew in an aircraft on a two-dimensional map display showing range, bearing, and intensity of a detected weather system, which may be convective or stratiform in nature. Flight hazards due to weather conditions are primarily the result of precipitation and turbulence. Airborne weather radar systems have been optimized to detect rain or wet precipitation.

Although aircrews desire to use the weather radar system as a hazard detector, the weather radar system does not make direct estimates of hazard. Instead, the radar system remotely estimates the reflectivity of precipitation in a sampled volume of the atmosphere. A simple model of reflectivity verses precipitation rate can then be used to estimate the rate of precipitation in that atmospheric volume.

Historically, high precipitation rates and high radar reflectivity estimates have been associated with two different hazards produced by convective weather: hail and turbulence. However, precipitation is driven from several major weather categories including the categories of stratiform, convective, orthographic, frontal, etc., some which are not necessarily hazardous.

Radar systems are calibrated to produce a green display when any precipitation is detected, a yellow display where reflectivity is high enough to produce some chance of a hazard, and a red display when weather produces reflectivity estimates high enough to infer a weather hazard is very likely. The current hazard metric is radar reflectivity based upon the JT Lee Hazard Curves, where 20-29 dBz equals green, 30-39 dBz equals yellow and 40 dBz and greater is red.

The JT Lee Hazard Curves describe the increased probability of hazards with the increase in dBz levels in North America. The likelihood of weather hazards is based on statistics generated over the North American continent in the spring and summer from radar estimates reflectivities taken from ground based radars. However, reflectivity is not necessarily indicative of a hazardous weather condition throughout the world, only of rainfall rates. Airborne weathers radars that are used at other altitudes and geographies from where the hazard model data was captured do not necessarily capture the threat statistics desired by the aircrew.

Pilots are taught to stay away from hazardous weather. Pilots perceive weather encoded with either yellow or red levels as hazardous. Stratiform weather can exhibit yellow responses and still be non-hazardous. Also, convective weather that is at the end of its convective cycle can exhibit yellow responses and still be non-hazardous. Maneuvers around yellow encoded weather that is not hazardous results in an inefficient flight path.

The separation of weather situations into hazardous and non-hazardous conditions provides an operational advantage to aircrews. Planes flying through the tropical convergence zone (the equatorial regions) routinely encounter lines of storms tens of miles deep and hundreds of miles wide. A weather radar with the ability to differentiate hazardous weather conditions from non-hazardous weather conditions could provide aircrews with enough information to make a safe and smooth penetration, as opposed to a long flight path deviation, saving the airline time and money.

As aircraft traffic increases, conservative routing by air traffic control in the vicinity of bad weather becomes more difficult. Therefore, air traffic controllers require a greater ability to route airplanes through safer portions of hazardous weather.

Accordingly, there is a need for a system and method of identifying hazardous and non-hazardous weather. Further, there is a need for a system for and method of automatically adapting the display of rainfall rates to reflect the likelihood of hazards. Yet further, there is a need for an avionic weather radar system which can differentiate hazardous versus non-hazardous weather. Further still, there is a need for a weather radar system that can identify hazardous versus non-hazardous weather regions to enable more direct flights through weather.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment relates to a weather radar system. The weather radar system includes electronics for receiving weather radar returns and detecting at least one non-hazardous weather region in a precipitation weather system. The electronics determines a spatial frequency parameter or a reflectivity gradient parameter. The spatial frequency parameter can be derived from the fourier transform of radar return levels verses range. The reflectivity gradient parameter can be derived from the fourier transform of radar return levels verses range. The electronics detects the non-hazardous weather region based upon at least one of the spatial frequency parameter or the reflectivity gradient parameter.

Another exemplary embodiment relates to a method of detecting a non-hazardous weather region for an aircraft.

The method includes steps of receiving radar returns and determining a plurality of parameters related to the radar returns. The parameters being related to spatial frequency and reflectivity gradient. The method also includes a step of determining the non-hazardous weather region from the parameters.

Still another exemplary embodiment relates to an apparatus. The apparatus includes means for determining a first factor from weather radar returns, an a means for determining a second factor from the weather radar returns. The apparatus also includes means for determining a presence of a decaying convective cell or a stratiform weather region in response to the first factor and the second factor.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Exemplary embodiments in the present application are for a system and method to detect non-hazardous weather and/or indicate the non-hazardous weather on a weather radar display that can be incorporated into an existing weather radar system. Several embodiments are disclosed that can be used individually or in combination to improve performance.

In a preferred embodiment, a weather radar system 10 is optimized to detect non-hazardous weather using two parameters. The preferred embodiment can achieve non-hazardous weather detection using a spatial frequency parameter and a reflectivity gradient parameter. Alternatively, other parameters, (e.g., cell height, lightning, and turbulence) can be used to assess and/or verify a non-hazardous weather system or a portion of a weather system. As explained below with reference to FIGS. 4-9, system 10 can be optimized to prevent inefficient flight plans that avoid weather that is non-hazardous.

According to another preferred embodiment, weather radar system 10 advantageously compensates weather radar vectors before display of the weather radar system on a screen. The compensation reduces the intensity of the display of rainfall rates or reflectivity for non-hazardous regions. According to one example, red regions are reduced to yellow regions and yellow regions are reduced to green regions if such regions are non-hazardous weather. According to another embodiment, red regions remain on uncompensated whether or not a non-hazardous determination is made. According to another embodiment, non-hazardous regions are represented by an outline around the region or by a symbol provided on the display (e.g., a "C" for convective cell).

Figure 1:
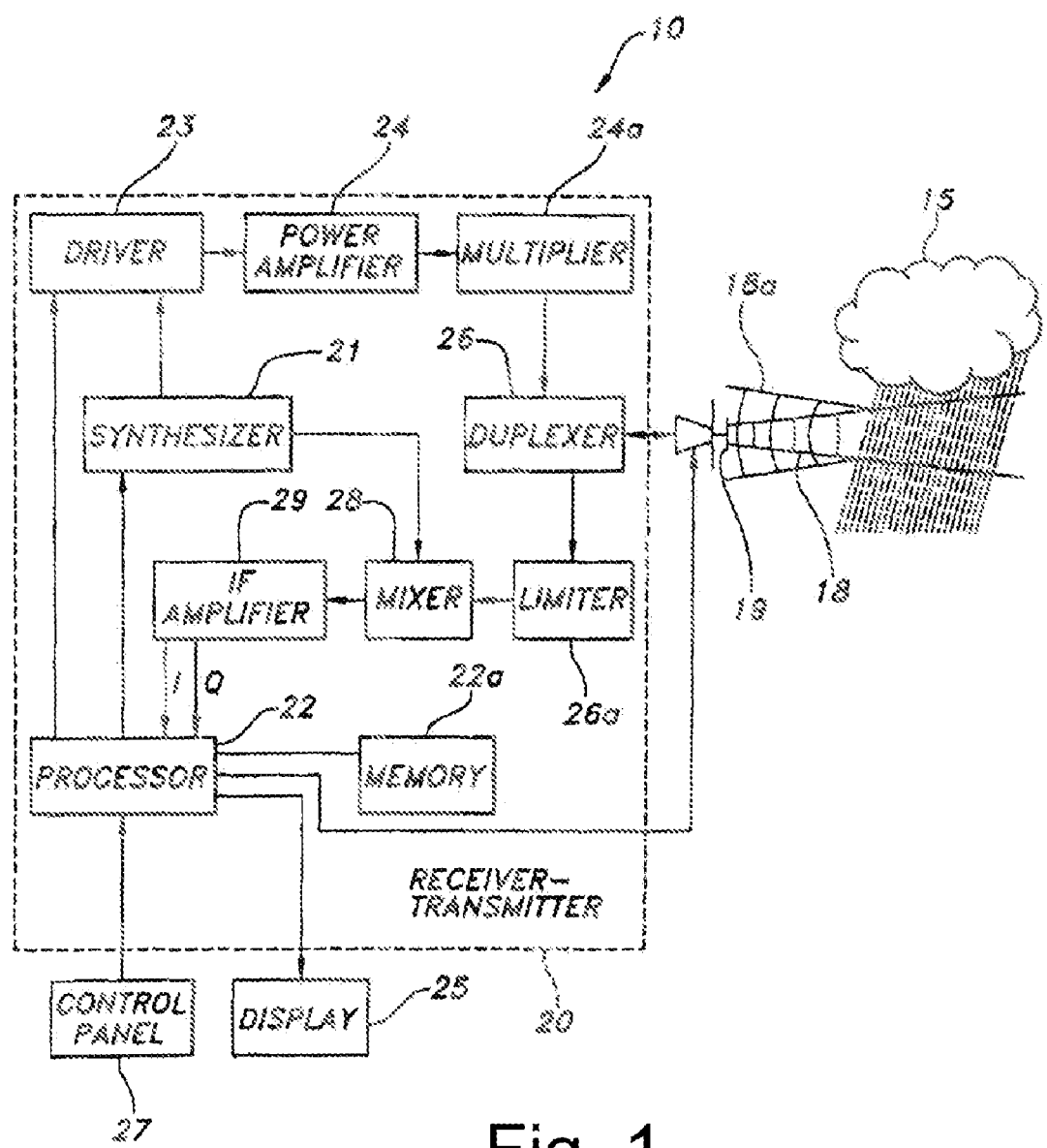
FIG. 1 is a general block diagram of an exemplary weather radar system.

Weather radars are known in the art for detecting severe weather and for providing a flight crew in an aircraft a two-dimensional map display showing range, bearing, and intensity of detected weather systems. Flight hazards due to weather conditions are primarily the result of precipitation and turbulence. A block diagram of a representative weather radar 10 that may incorporate any embodiment in the present application is shown in FIG. 1. The weather radar 10 may be a WXR-2100 MULTISCAN Weather Radar System manufactured by Rockwell Collins Inc. and used herein as an exemplary weather radar system in which to incorporate the present invention.

In FIG. 1, pulses 18 are transmitted from the weather radar system 10 using antenna 19 and reflected from a target 15 as return pulses 18a that are received by the antenna 19. Within a receiver-transmitter 20, the transmitted pulses 18 are generated using a reference signal from a synthesizer 21. The width and pulse repetition frequency (PRF) of the pulses 18 are generated in a driver 23 and controlled by a processor 22. The pulses 18 are amplified in power amplifier 24 and multiplied to a final transmit frequency in multiplier 24a. A duplexer 26 directs the multiplier 24a output to the antenna 19.

The return pulses 18a from the target 15 are passed through the duplexer 26 to a limiter 26a where strong return pulses 18a are attenuated. The output of the limiter 26a is connected to a mixer 28 where the return pulses 18a are down converted in frequency by mixing with an oscillator signal from the synthesizer 21 to produce an intermediate frequency (IF) return signal that is amplified by an IF amplifier 29.

The IF return signal is converted into in-phase (I) and quadrature (Q) components and digitized in the IF amplifier 29. The digitized return signals are then processed by the processor 22. The processor 22 uses a series of algorithms to determine the magnitude, spectral width, spatial frequency, reflectivity, gradient, and velocity gradients of each return pulse 18a. In addition, the processor 22 can include an algorithm for determining cell height, the presence of lightning and turbulence. Alternatively, system 10 can be coupled to distinct systems for determining the above listed factors.

The results of the processed returns are then encoded to a serial data word that is sent to a system display 25. Encoded in the serial data word is the reflectivity data and message information to be displayed to the flight crew. The colors on the display 25 indicate the reflectivity with black representing zero to minimal reflectivity, green representing light reflectivity, yellow indicating moderate reflectivity, red representing heavy to extreme reflectivity, and magenta indicating turbulence.

A weather radar system control panel 27 provides control signals to the weather radar system receiver-transmitter 20. Depending upon the weather radar system configuration, the control panel 27 provides operating mode selection, ground clutter suppression selection, system select, antenna tilt control in manual mode, and system gain control.

The amount of energy returned in the return pulses I & Q depends on the reflective quality of the target 15. When short pulses strike a target 15 such as precipitation, some of the energy is absorbed, some of it is refracted, and the remainder is reflected. Heavy rainfall produces the strongest reflections; light rainfall, snow, and ice crystal produce weak returns.

The strength of the return pulses 18a is also related to the distance the pulses must travel. Radar systems compensate for the attenuation of the signal due to the distance traveled with a sensitivity time control (STC) function (not shown). The STC function controls receiver sensitivity with respect to time and thus range. The receiver sensitivity increases during the period between transmitted pulses when the receiver is listening for return pulses.

The return pulses 18a provide strength information and range to the target 15 such as a thunderstorm in FIG. 1. The range of the target 15 is determined by the amount of elapsed time that occurs between the transmission of a pulse 18 and the reception of the reflected or return pulse 18a. The direction or azimuth bearing of the target 15 is determined by noting the azimuth pointing position of the antenna 19. Bearing and range information is then coupled with the reflectivity information and applied to the display 25.

The exemplary WXR-2100 MULTISCAN Weather Radar System is capable of operating in an automatic multiscan mode with processor 22 controlling the weather radar system gain and antenna 19 tilt functions over multiple tilt settings and storing the individual scan data in a memory 22a of the system receiver-transmitter 20. This scan data is continually refreshed and corrected in the memory 22a for aircraft motion by processor 22. The data sent to the system display 25 is a composite of multiple scans that have been processed to remove ground clutter and refine the image. This operation optimizes the display images shown to the flight crew by showing short. mid, and long range weather targets.

In the exemplary weather radar system 10, the total time required to complete one cycle of multiple tilt scans in any of the weather detection modes except windshear is eight seconds. In the windshear mode a complete cycle requires 11.2 seconds. The digital image is translated and rotated in the memory 22a under processor 22 control to compensate for aircraft movement during the multiple scans. This weather radar operation is described in U.S. Pat. No. 6,424, 288 "Multi-Sweep Method and System for Detecting and Displaying Weather Information on a Weather Radar System" by Daniel L. Woodell and U.S. Pat. No. 6,603,425 "Method and System for Suppressing Ground Clutter Returns on an Airborne Weather Radar" by Daniel L. Woodell, both patents assigned to the assignee of the present application, and incorporated herein by reference.

Figure 2:
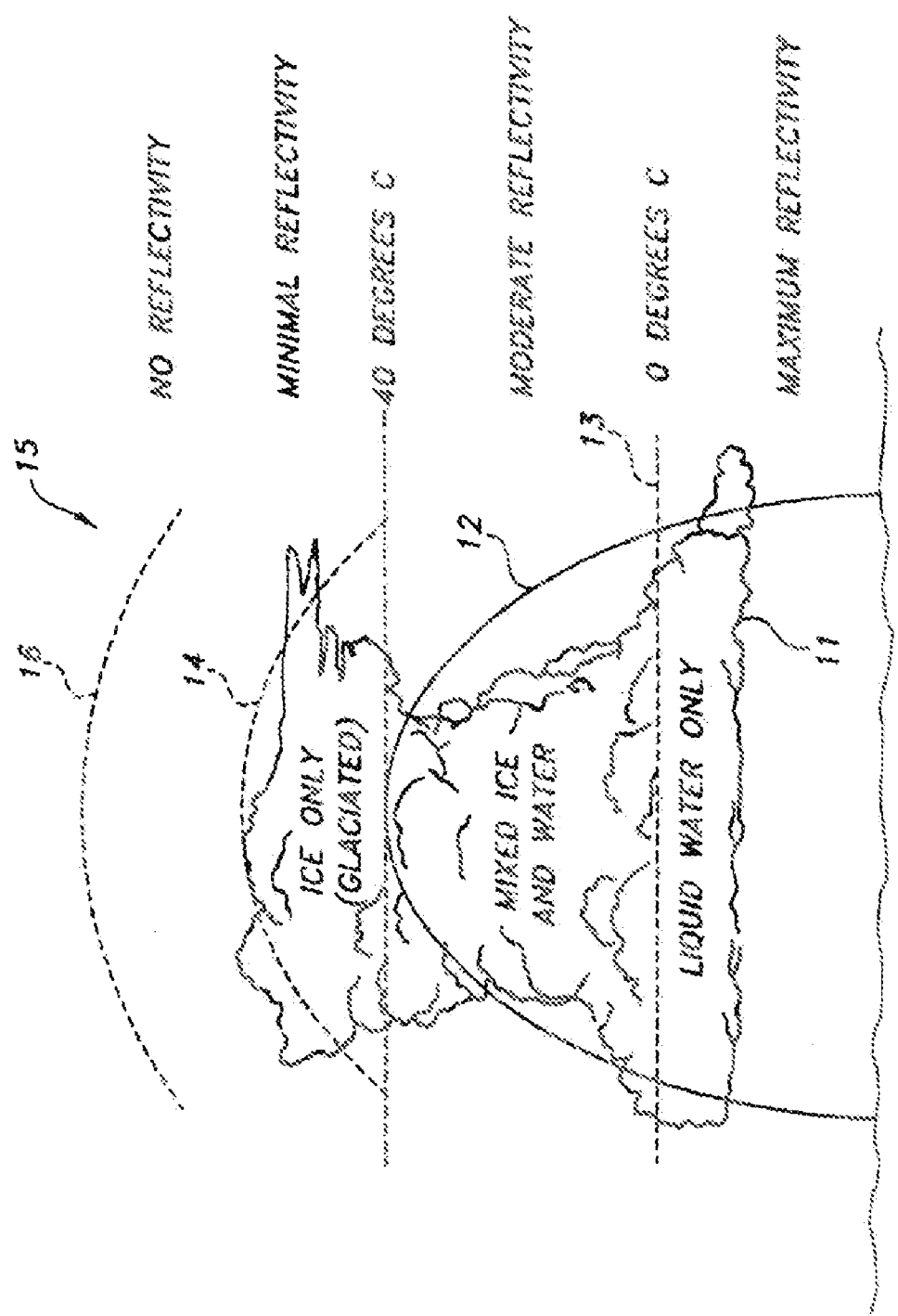
FIG. 2 is a diagram illustrating the geometric distribution of typical thunderstorm.

To understand multiscan operation, it is necessary to understand a typical thunderstorm. FIG. 2 is a diagram illustrating the geometric distribution of typical thunderstorm 15. A portion 11 of thunderstorm 15 at the lowest altitude contains liquid water only. This wet portion 11 has a high level of radar reflectivity. Above a freezing level 13, thunderstorm 15 includes a mixture of ice and water, with moderate radar reflectivity, and a portion of thunderstorm 15 above a temperature level of about −40 degrees C. contains ice only, with relatively low radar reflectivity. Above the ice portion of thunderstorm 15, there is a region 16 with little or no radar reflectivity, where turbulence may exist due to a building thunderstorm 15.

Based on the geometry of thunderstorm 15, regions may be defined by their ability to be detected by radar, their visibility, and their effect on an aircraft. Region 12, which includes the liquid water and the mixed ice and water portions of thunderstorm 15, is a region that is detectable by the aircraft weather radar system 10, due to the high and moderate radar reflectivity of those portions of the thunderstorm 15. Region 14, which includes the ice portion of thunderstorm 15, is a region that is visible to a pilot but is not normally detectable by radar, due to the low radar reflectivity of the ice portion of thunderstorm 15. Region 16 is not visible or detectable by radar, but is a region of possible high turbulence that can affect the stability of an aircraft passing through.

Since most weather threats are associated with convective weather such as thunderstorm 15, the detection of convective weather should be optimized throughout such weather's maturity cycle. Optimal convective weather detection samples the region of space at or near the freezing altitude 13 in the atmosphere since detectable reflectivity begins at this attitude and reflectivity is strongest at this altitude for most of a convective weather cell's life cycle.

Figure 3:
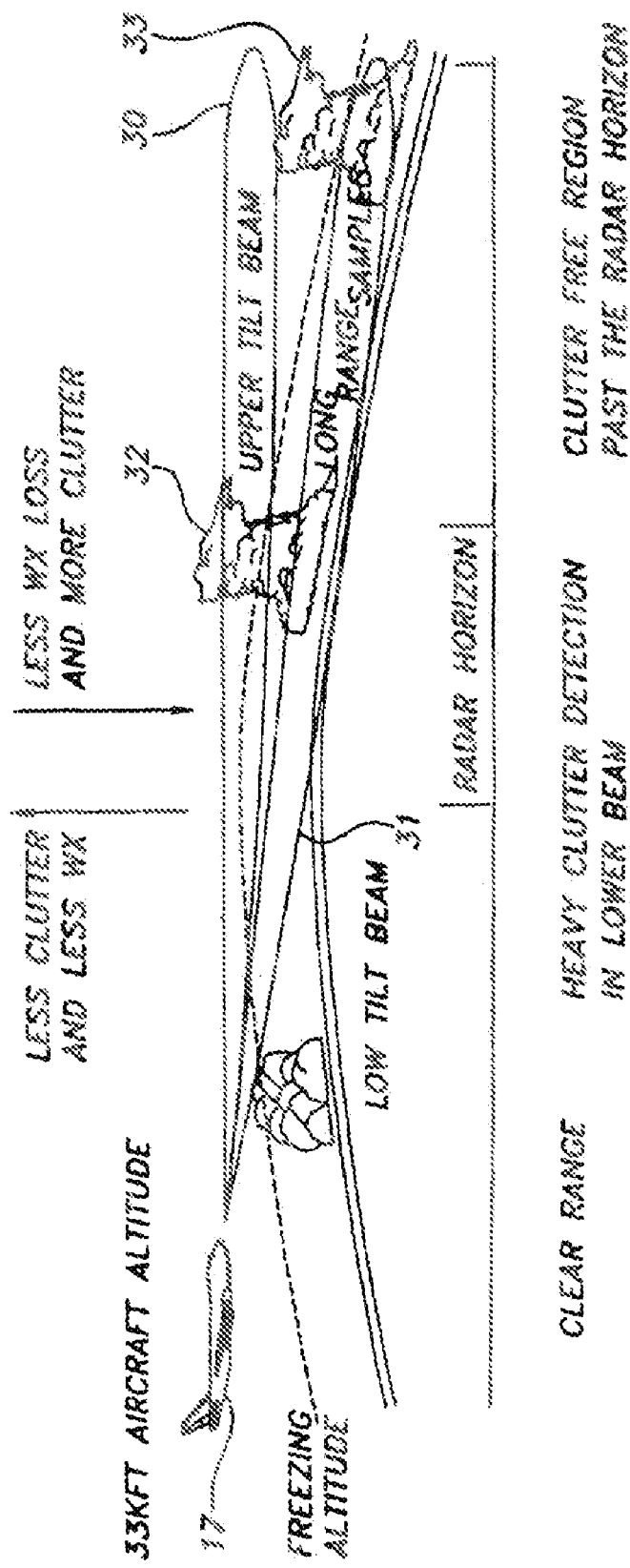
FIG. 3 illustrates multiscan operation of the weather radar system of FIG. 1.

FIG. 3 shows an aircraft 17 flying at 33,000 feet using an upper tilt beam 30 and lower tilt beam 31 to illuminate weather (precipitation) targets 32 and 33. During multiscan operation the receiver-transmitter 20 transmits, during a clockwise sweep, a non-windshear pulse pattern at the upper tilt angle. The next sweep the receiver-transmitter 20 transmits the non-windshear pulse pattern at the lower tilt angle. The tilt angles used during multiscan operation are dependent upon aircraft 17 barometric altitude and the terrain height. Reflectivity data is gathered from both tilt scans at four different frequencies using two different pulse widths. The data is placed into memory 22a in memory planes with each scan generating a short pulse memory plane (0 to 44 nm) and a long pulse memory plane (0 to 331 nm). For the upper tilt beam 30 and lower tilt beam 31, four memory planes are generated.

The processor 22 performs several algorithms that identify ground clutter within the reflectivity using scan-to-scan correlation and beam-to-beam correlation. The data stored in the memory planes is used to support all selected ranges, modes of operation, and selected display options. Transmit pulse widths of 6 and 25 microseconds build 512 sample bins for long range data and 256 sample bins for short range data in the multiscan system.

The memory 22a is geographically aligned in memory planes. The data in each plane is located so that the target data can be correlated between each of the memory planes. The data stored is averaged and filtered with each subsequent scan. The data is continually refreshed and corrected for aircraft motion. All significant weather data is available in the memory planes.

When the data is processed for display, the data from the short range pulses and long range pulses from both the upper and lower tilt scans is merged, ground clutter eliminated, the flight crew commanded display options are processed and the weather optimized display data is sent to the display 25. The data sent to the display 25 is generated from the four memory planes and not directly related to the antenna scan. The data sampling process has been decoupled from the display 25 process to provide the multiple beam advantage of a merged, optimized display of weather targets from 0 to 320 nm.

Multiscan is designed for fully automatic operation. For automatic operation the flight crew selects the automatic function, a display mode WX (weather), WX+T (weather plus turbulence), or TURB (turbulence), and a desired range. Once in automatic multiscan mode the processor 22 adjusts antenna 19 tilt and receiver gain to provide an optimum weather display for any range scale. In the WX+T and TURB modes, turbulence is displayed out to 40 nm for all selected ranges. Because multiscan operation uses multiple scans to detect all significant weather targets, the entire weather picture from 0 to 320 nm is stored in memory 22a. This includes turbulence data and precipitation velocity variances.

Turbulent areas within a precipitation weather target 15 can be identified by Doppler processing of transmit and receive signals in the weather radar system 10. A turbulent target is a target that exhibits a wide variance in particle velocities. The velocity variance of droplets can be thought of as a spectrum of velocities. The broader the spectrum, the greater the turbulence present in the weather target. To provide an accurate spectrum of return signal frequencies, a large number of samples (returns) must be used to produce accurate and reliable results. The threshold of turbulent targets in precipitation exceeds a velocity width of 5 meters/second. This threshold translates into a Doppler frequency shift of 312.5 Hz. For this reason, PRF (pulse repetition frequency) in the turbulence mode of operation is increased to 1838 pulsed/second. With this large number of transmit pulses 18, the receiver-transmitter 20 processes every pulse for precipitation information and provides turbulence data from the spectrum of Doppler shifts caused by precipitation movement. Because of the high PRF rate, the maximum range for turbulence detection is approximately 44 miles.

Once an accurate spectrum of return signals is obtained, turbulence processor circuits or software determine if the spectrum represents a spectrum of a turbulent target. The alert threshold for passenger carrying air transport aircraft is approximately 5 to 7.5 meters-per-second. The five meter-per-second threshold corresponds to the threshold between light and moderate turbulence that can cause food and beverage spillage or possible minor injury.

The frequency of the return signal is offset from the transmitted frequency because of the Doppler shift caused by the velocity of the aircraft 17 with respect to the target 15. In addition to the frequency shift caused by the aircraft velocity, a frequency shift is caused by the movement of the precipitation. To measure the spectrum width of the frequency shifts caused by precipitation movement, the Doppler shift due to the aircraft must be filtered out.

The pulse width transmitted is selected based upon the selected range and mode of operation. By using multiple pulse widths, the receiver-transmitter 20 can optimize the operation of the system for a particular range and operation mode. This optimization provides a better resolution in the weather display and efficient use of the transmitted energy. Another factor selected in the receiver-transmitter 20 to optimize performance is the pulse repetition frequency (PRF). PRF optimization is possible with separating detection from assessment. At shorter selected ranges, the receiver portion of the receiver-transmitter 20 is not required to listen for relatively long periods of time. The transmitter is then free to increase the number of transmitted pulses 18. The greater number of transmitted pulses 18 provides more information and a faster update of weather targets present. The PRF may be optimized for detection of a weather system and then changed to a PRF optimized for assessment.

Figure 4:
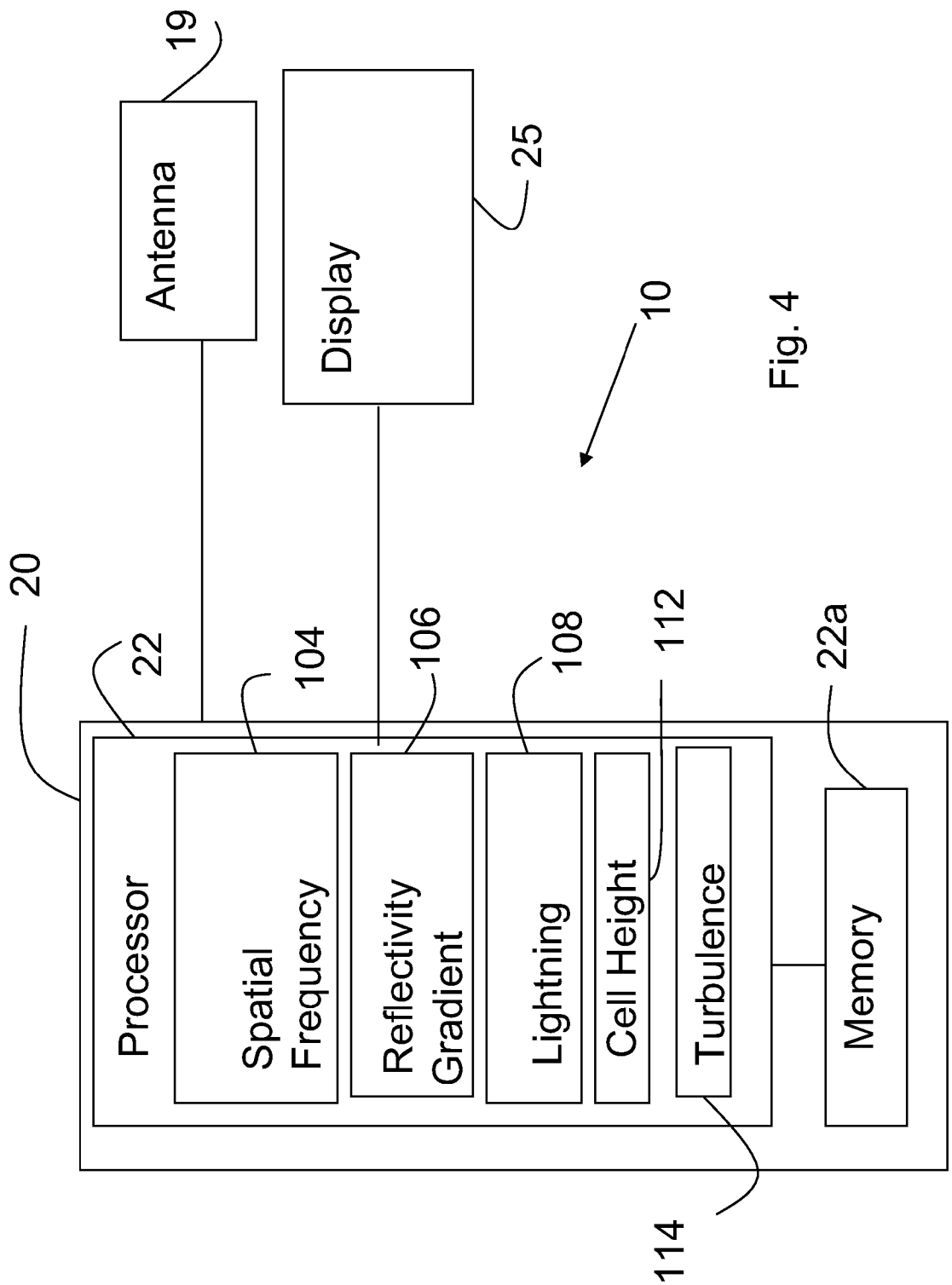
FIG. 4 is a general block diagram showing the weather radar system illustrated in FIG. 1 configured to detect non-hazardous weather regions in accordance with an exemplary embodiment.

A typical pattern of transmitted pulses 18 for non-wind-shear operation in the weather radar system 10 is shown in FIG. 4 for the weather mode. For any selected range one 25-microsecond pulse and four 6-microsecond pulses are transmitted during each process epoch of 8.333 milliseconds in this example. After transmitting the 25-microsecond pulse there is a 4.9-millisecond space. This allows returns from targets as far away as 331 nautical miles. Other pulse patterns (not shown) are possible such as a compressed long pulse with high range resolution with or without the simple short pulses. Compressed long use pulse compression techniques known in the art and have range resolution similar to short pulses.

A process epoch is the time interval in which a radial radar data is processed. This time is equal to the size of the radar processing element in degrees divided by the antenna 19 scan rate in degrees per unit time. This pulse pattern is transmitted at each radial of the radial of the scanning antenna 19. The transmitting frequency alternates between seven weather transmit channel frequencies. For example, the weather radar system 10 is operating in a weather detection mode and the antenna 19 is scanning clockwise. At the 0-degree radial the transmitter transmits the pulse pattern of FIG. 4 on a first transmit channel frequency of seven frequencies.

At the completion of the epoch, the antenna 19 moves a three eights-degree clockwise and the pulse pattern is transmitted again at one of six remaining frequencies. At the next three eights-degree radial of the antenna 19, the transmit pulse pattern is repeated at one of the remaining six transmit frequencies. The pulse pattern and seven frequencies are used for all non-windshear modes of operation such as weather, turbulence, weather plus, turbulence, and ground mapping detection.

The operational details, thresholds, architecture, and processes of system 10 are not described in a limiting fashion and are provided as exemplary information. System 10 can be any type of single beam, multibeam or volumetric scanning system. Systems and subsystems described as circuits can utilize software to implement some or all of the described functionality.

The system and method of the present application can advantageously be incorporated into the weather radar system 10 to detect and display (or adjust the display to reflect) non-hazardous weather regions on the weather radar display 25. Changing operational parameters and architecture to incorporate embodiments into various types of radar systems does not depart from the scope of the invention.

With reference to FIG. 4, system 10 is configured in accordance with a preferred exemplary embodiment. System 10 includes receiver-transmitter 20 coupled to antenna 19 and display 25. Receiver-transmitter 20 includes a processor 22 and memory 22a. Antenna 19 can be any type of antenna.

Processor 22 includes a spatial frequency detector 104, a reflectivity gradient detector 106, a lightning detector 108, a cell height detector 112 and a turbulence detector 114. Detectors 104, 106, 108, 112 and 114 can be implemented by a combination of circuitry and software. For example, programmable logic devices and digital signal processes executing software can be utilized to implement the functions of detectors 104, 106, 108, 112 and 114.

Weather regions may include hazardous and non-hazardous portions which can be detected using system 10 illustrated in FIG. 4. For example, in a weather system shown on display 25 as a precipitating system, the weather system may include stratiform weather which is generally non-hazardous or decaying convective weather cells which are more stable and stratiform-like and hence are generally non-hazardous.

Hazardous weather, such as convective weather, generally occurs when the ground heats up and warm moist air rises rapidly from its surface. The warm air produces hazards for aircraft, such as turbulence, hail and icing. Irregular and localized rapid lifting causes convective areas. The irregular and localized rapid lifting also causes the altitude of the freezing layer near the convective weather to vary sharply. Hail can be produced at the freezing layer. Wet hail found nearest the freezing layer is generally highly reflective.

In contrast to convective weather, stratiform weather or a stratiform rain occurs when moist air is undercut by wide spread denser colder air. The freezing layer in a stratiform weather region is the point in the atmosphere at zero degrees Celsius where moisture turns in to ice crystals. The icr crystals nearest the freezing layer are generally wet and highly reflective. Because of this high reflectivity, radar returns from this region appear on a conventional radar display as a red hazard level. While this type of weather can produce a red display and icing hazards, it does not generate the hazards that are typical of convective weather, such as hazards of turbulence and hail. Stratiform weather is therefore generally non-hazardous or at least less hazardous than convective weather at the same rainfall rates.

System 10 is advantageously optimized to differentiate hazardous regions from non-hazardous regions. System 10 can be configured to advantageously detect long constant altitude weather extensions associated with stratiform weather. Convective weather generally exists over more limited spatial regions. In addition, stratiform weather varies little over large regions while convective layer consists of many updraft and downdraft channels each with different radar reflectivity. Alternatively, system 10 can detect hazardous versus non-hazardous weather by determining the consistency of the altitude of the freezing layer.

Figure 7:
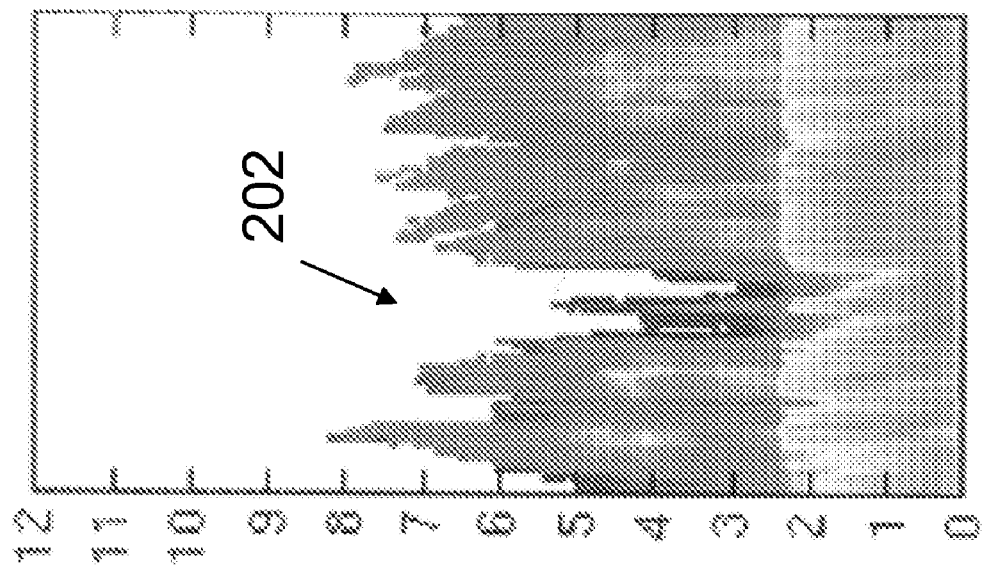
FIG. 7 is a drawing showing radar reflectivity of a stratiform weather region.
Figure 6:
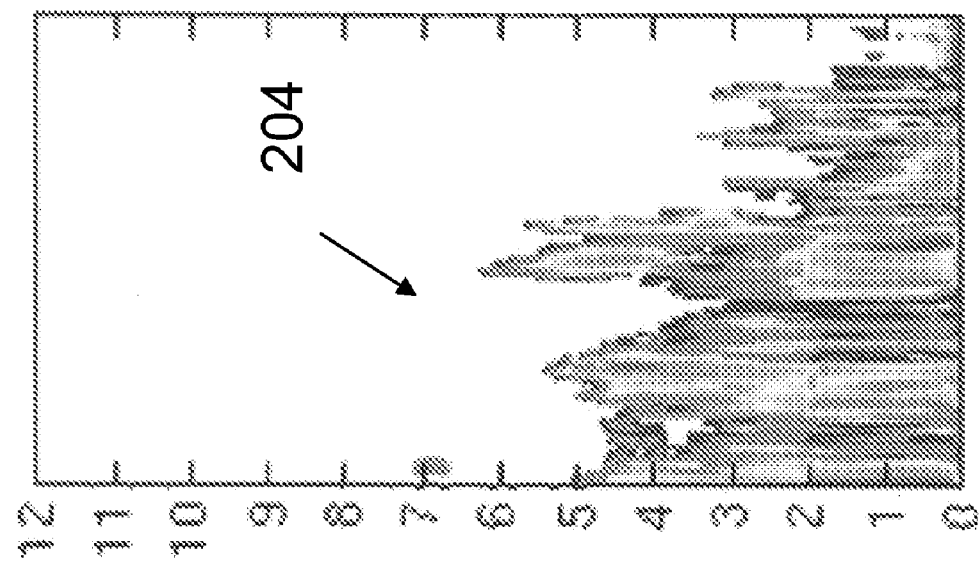
FIG. 6 is a drawing showing radar reflectivity of a convective weather region.

FIG. 6 shows non-stratiform weather region 204 and FIG. 7 shows a stratiform weather region 202. In FIGS. 6 and 7, the Y axis represents height in kilometers and the X axis represents range in front of the aircraft. The different grey scales represent radar reflectivity.

A convective weather region (non-stratiform weather region 204) (see FIG. 6) has significant changes in radar reflectivity across altitude as shown by the different grey scales in the direction of the Y axis. In contrast, stratiform weather region 202 (see FIG. 7) has relatively consistent grey scales in the direction of the Y axis. In addition, stratiform region 202 has grey scales that are more consistent across the X axis when compared to convective region 204.

With reference to FIG. 4, processor 22 determines a spatial frequency parameter from spatial frequency detector 104 and a reflectivity gradient parameter from reflectivity gradient detector 106. When a weather target has both a low spatial frequency parameter (spatial extent) and a small reflectivity gradient, that weather has a high probability of being non-hazardous weather. Accordingly, processor 22 provides an indication to display 25 or compensates the signal provided to display 25 so that display 25 provides an indication of the non-hazardous weather region. A typical convective weather cell size is approximately 3-5 nautical miles. The lifting associated with the convective cell produces large variations in reflectivity which would be indicated by a high spatial frequency and/or a large reflectivity gradient.

In operation, processor 22 preferably utilizes a set of azimuth radar samples and compares the reflectivity layers at several ranges with separations of at least a typical cell size (e.g., 3 nautical miles). Hazard discriminators utilize the spatial frequency parameter or the reflectivity gradient parameter to make comparisons to thresholds. In addition, processor 22 can receive inputs from lightning detector 108, cell height detector 112 and turbulence detector 114 to make a hazardous verses non-hazardous determination. Preferably, detectors 108, 112 and 114 are utilized for detections based upon detectors 104 and 106. Turbulence detection is the preferred verification technique for use in short range and lightning correlation is the preferred verification technique in long range. Processor 22 also preferably omits hazardous weather detection and compensation processes for regions having a reflectivity of greater than 39 dBz.

Figure 5:
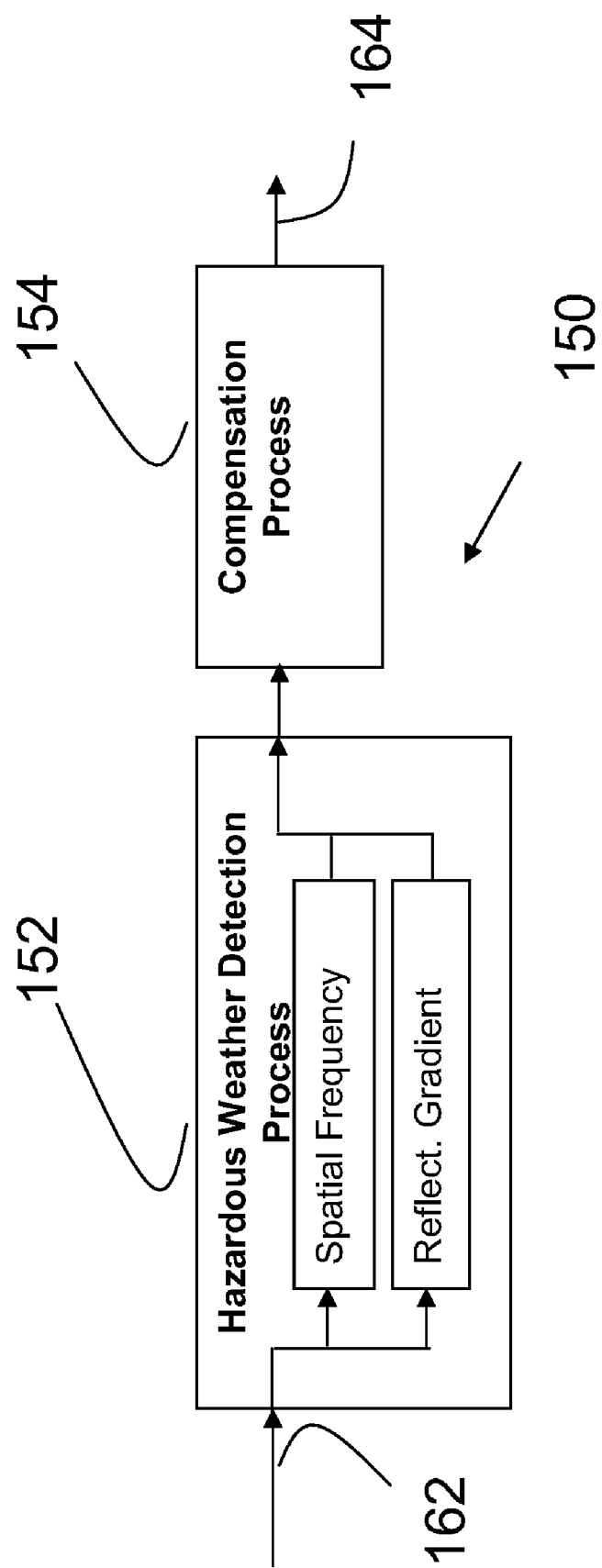
FIG. 5 is a general flow diagram showing exemplary processing of weather vectors in the system illustrated in FIG. 4 in accordance with another exemplary embodiment.

With reference to FIG. 5, a compensation process 150 can be implemented by system 10. Once a non-hazardous region is detected by hazardous weather detection process 152, the non-hazardous regions can be modified utilizing a compensation process 154. Preferably, weather radar vectors are provided at input 152 to hazard detection process 152. As discussed above, process 152 analyzes a spatial frequency parameter and a reflectivity gradient parameter to determine if compensation should occur. If compensation should occur, process 154 modifies or compensates the vectors provided at output 164.

The vectors are preferably modified or translated by changing the generally non-hazardous yellow display levels to green display levels. The green display levels indicate to a pilot a non-hazardous weather condition. Alternatively, process 154 can provide symbology or outline weather regions to define non-hazardous weather regions.

Figure 8:
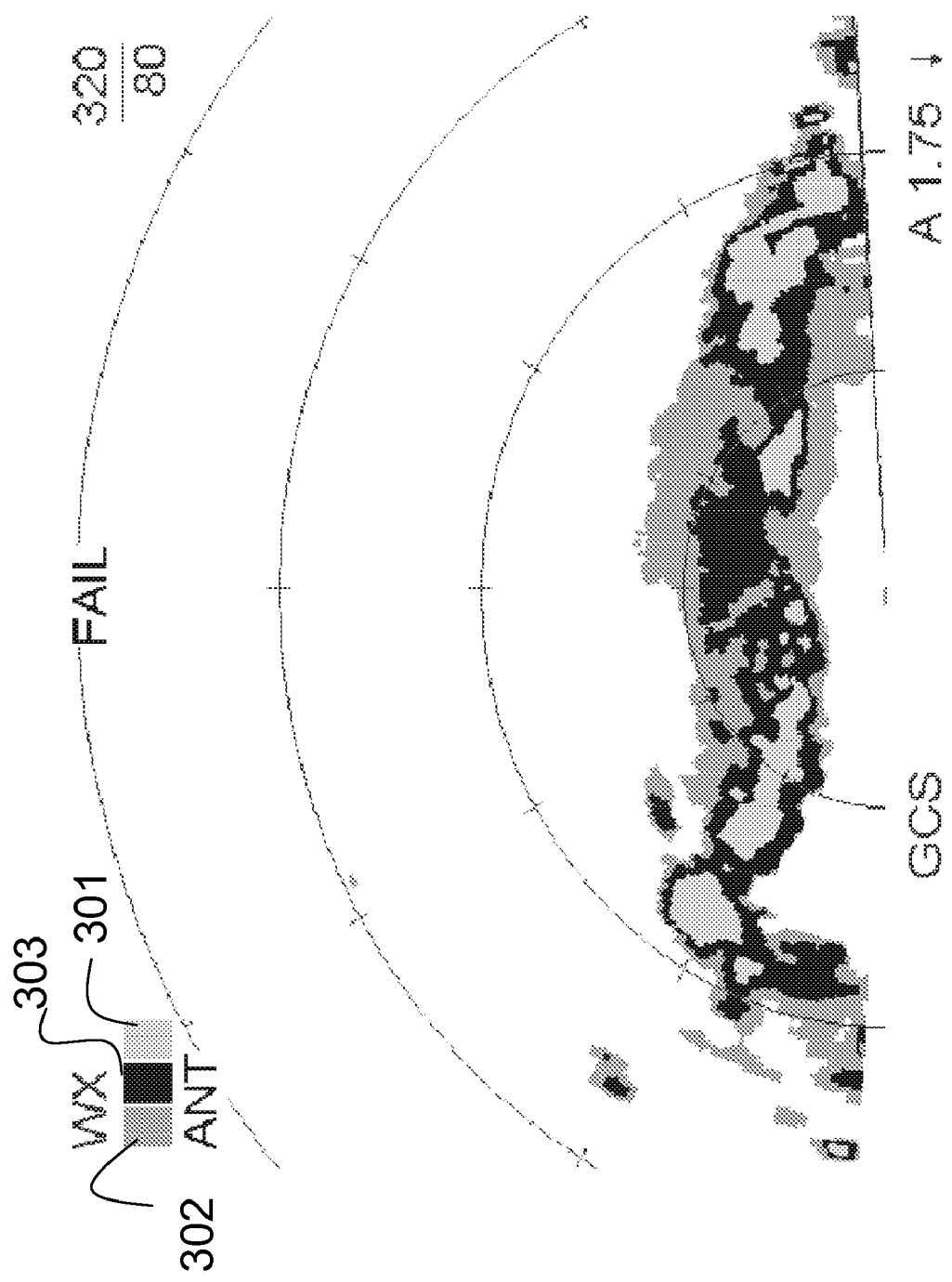
FIG. 8 is a depiction of an avionic display a showing a weather system without compensation from the system according to the processing illustrated in FIG. 5.
Figure 9:
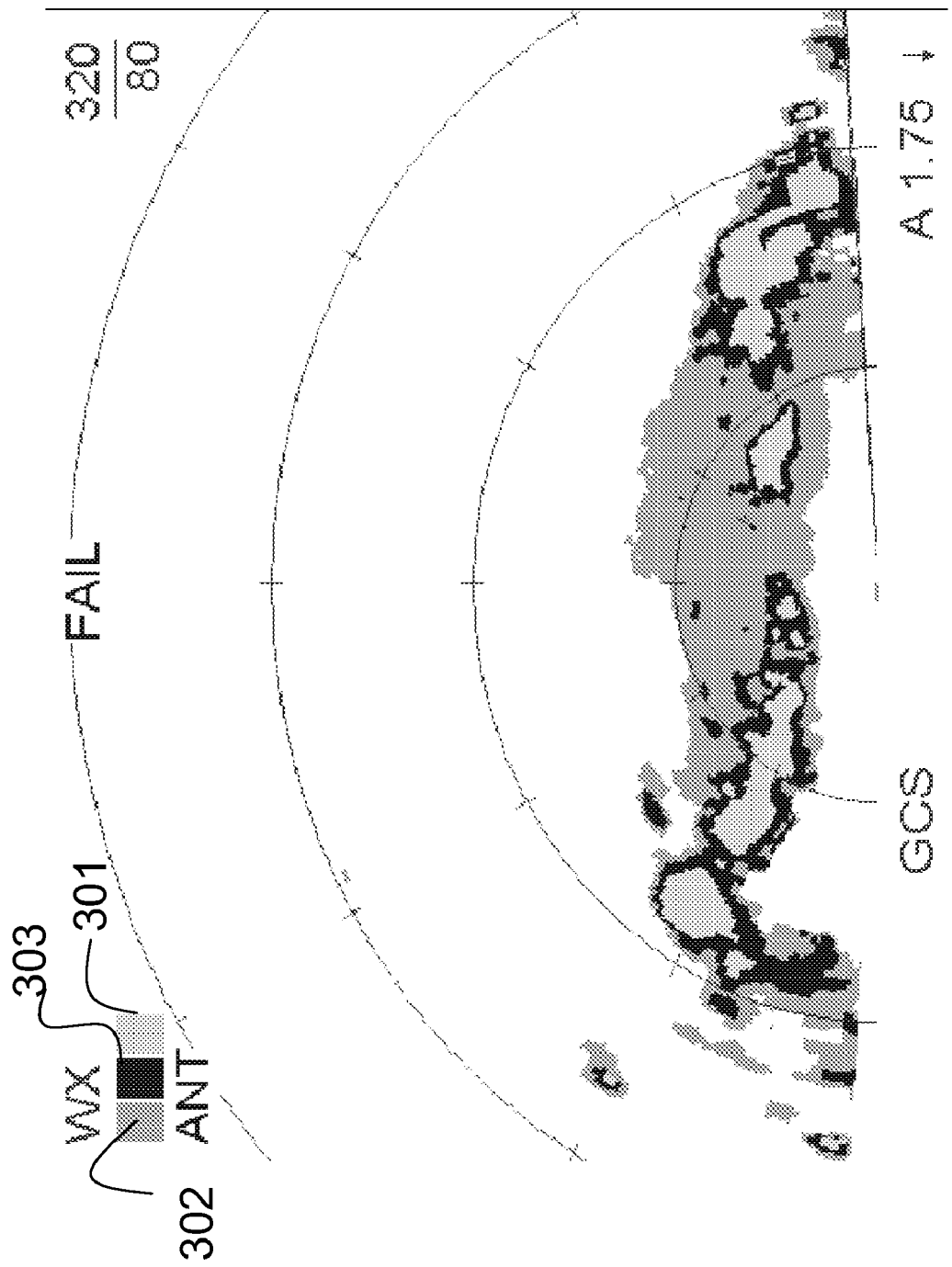
FIG. 9 is a depiction of an avionic display with compensation according to the processing illustrated in FIG. 5 in accordance with an exemplary embodiment.

With reference to FIGS. 8 and 9, a simulation of weather radar data is provided without compensation by system 10 in FIG. 8 and with compensation by system 10 in FIG. 9. In FIGS. 8 and 9, the weather radar display includes red areas 301 indicated by a light grey area, green areas 302 indicated by an intermediate grey area and yellow areas 303 indicated by a relatively dark area.

FIG. 9 shows a weather radar display compensated in accordance with a preferred embodiment of FIG. 4. As shown by comparison of FIG. 8 and FIG. 9, non-hazardous weather regions have been identified and displayed as green regions (color 302). FIG. 9 has less yellow regions 303 than FIG. 9. Using FIG. 9, a pilot can see a safe route through the weather by flying through green regions 302 as opposed to having to choose to fly around the weather region in FIG. 8 or through yellow regions 303. Therefore, system 10 allows penetration of a strong line of convective activity by providing better indication of non-hazardous regions.

Example 1 below discloses an algorithm that can be utilized by system 10 in a Rockwell Collins multi-scan type radar system. Example 1 is exemplary only and the present invention is not limited to the specific form shown. The algorithm is written in C code for operation on a general purpose type processor. Various types of software and hardware can utilized to perform the functions in the algorithm below.

EXAMPLE 1

Hazardous Weather Detection and Compensation Example Code:
Copyright 2005
Rockwell Collins Inc.

```
//The next azimuth to be displayed is tmp_453. If non-hazardous wx is detected, tmp_453
will be modified.
    //merge_scan contains multiple azimuths of processed wx data before and after the display
azimuth, including the data in tmp_453.
    //Example: If tmp_453 contains the azimuth at 0.25 degrees, merge_scan contains azimuths
from 0.00 through 0.50 degrees.
    //Example parameter values.
    int hi_dbz_thr = 39;        //high dbz threshold, highest yellow dbz
    int lo_dbz_thr = 30;        //low dbz threshold, lowest yellow dbz
    int last_bin = 256;    //last bin in display radial
    float num_samples = 3.0;    //number of azimuth samples
    float ref_grad_thr = 4.0;   //reflectivity gradient threshold
    int spatial_freq = 4;       //spatial frequency, range in bins between region centers, 5
nautical miles
    //As development continues, parameter values may float to provide soft thresholds. Potential
inputs to floating parameters may
    //include a historical perspective of the cell being analyzed, global weather modeling, etc.
    //non-hazardous weather detection and compensation loop
    for( bin = spatial_freq; bin < (last_bin - (spatial_freq + 1)); ++bin )
    {
      //Compute average bin values. Average bins contain average values taken from regions
ahead of, at and behind the current bin or range.
      //The ahead, at and behind regions may consist of multiple azimuths and range bins. The
regions are centered at a range slightly larger
      //than a standard convective cell.
      sum_bins = merge_scan[0][bin - spatial_freq] + merge_scan[1][bin - spatial_freq] +
merge_scan[2][bin - spatial_freq];
      avg_behind = sum_bins/num_samples;
      sum_bins = merge_scan[0][bin] + merge_scan[1][bin] + merge_scan[2][bin];
      avg_at = sum_bins/num_samples;
      sum_bins = merge_scan[0][bin + spatial_freq] + merge_scan[1][bin + spatial_freq] +
merge_scan[2][bin + spatial_freq];
      avg_ahead = sum_bins/num_samples;
      //check to see if the gradient is less than the reflectivity gradient threshold, and that the
current display bin is within a reasonable dbz range.
      if( (abs(avg_at - avg_ahead) < ref_grad_thr) &&
        (abs(avg_at - avg_behind) < ref_grad_thr) &&
        (tmp_453[bin] =< hi_dbz_thr) &&
        (tmp_453[bin] >= lo_dbz_thr))
      {
        //non-hazard detected, change display data to non-hazardous level
        tmp_453[bin] = lo_dbz_thr - 5;
      }
    }
```

While the detailed drawings, specific examples, and particular formulations given describe preferred and exemplary embodiments, they serve the purpose of illustration only. The inventions disclosed are not limited to the specific forms shown. For example, the various functions may be performed in any of a variety of sequence steps, or by any of a variety of hardware and software combinations. The systems and methods depicted and described are not limited to the precise details and conditions disclosed. Furthermore, other substitutions, modifications, changes, and omissions may be made in the design, operating condition and arrangements and be exemplary embodiments without departing from the scope of the invention as expressed in the appended claims.

What is claimed is:

1. A weather radar system, comprising electronics for receiving radar returns and detecting at least one non-hazardous weather region in a precipitation weather system, the electronics determining a spatial frequency parameter or a reflectivity gradient parameter, the spatial frequency parameter being derived from the radar returns, the reflectivity gradient parameter being derived from the returns, the electronics detecting non-hazardous weather region based upon at least one of the spatial frequency parameter and the reflectivity gradient parameter.

2. The weather radar system of claim 1, wherein the radar returns are azimuth returns.

3. The weather radar system of claim 2, wherein the azimuth returns are at a plurality of ranges.

4. The weather radar system of claim 1, further comprising:
a display coupled to the electronics, wherein the electronics reduces a color ordinarily provided on the display when the spatial frequency parameter is relatively low and the reflectivity gradient parameter is relatively small.

5. The weather radar system of claim 1, wherein the electronics receives weather radar vectors and compensate for the weather radar vectors when the reflectivity gradient parameter and spatial frequency parameter indicate non-hazardous weather.

6. The weather radar system of claim 1, wherein the electronics detects stratiform weather.

7. The weather radar system of claim 1, wherein the electronics omits regions having a reflectivity parameter over a threshold from the non-hazardous weather region.

8. The weather radar system of claim 7, wherein the threshold is greater than 39 dBz.

9. The weather radar system of claim 1, further comprising a display, wherein the non-hazardous weather is indicated on the display by a color, by an outline, or by a symbol.

10. A method of detecting a non-hazardous weather region for an aircraft, the method comprising steps of:
receiving radar returns;
determining a plurality of parameters related to the radar returns, the parameters being related to spatial frequency and reflectivity gradient; and
determining the non-hazardous weather region from the parameters.

11. The method of claim 10, further comprising a peak velocity.

12. The method of claim 10, wherein the second determining step compares the spatial frequency to a threshold.

13. The method of claim 10, wherein the second determining step compares the reflectivity gradient to a threshold.

14. The method of claim 10, wherein the non-hazardous weather region is a decaying convective cell or a stratiform weather system.

15. The method of claim 10, wherein the method is performed during an approach or take-off.

16. An apparatus, comprising:
means for determining a spatial frequency parameter from weather radar returns;
means for determining a reflectivity gradient parameter from the weather radar returns; and
means for determining a presence of a decaying convective cell or a stratiform weather region in response to the spatial frequency parameter and the reflectivity gradient parameter.

17. The apparatus of claim 16, wherein the apparatus determines a non-hazardous region.

18. The apparatus of claim 17, wherein the apparatus utilizes short range turbulence detection and long range lightning correlation to identify the non-hazardous region.

19. The apparatus of claim 17, wherein the non-hazardous region is displayed on a terminal area hazard screen of a weather radar display.

20. The apparatus of claim 17, wherein the non-hazardous region is displayed in response to the spatial frequency parameter and the reflectivity gradient parameter.

* * * * *